July 7, 1970 MASAMI YOSHIYAMA ET AL 3,519,880
ELECTROLUMINESCENT IMAGE DISPLAY SYSTEM HAVING IMPROVED HORIZONTAL SCANNING Filed Nov. 29, 1967 4 Sheets-Sheet 1

INVENTORS
MASAMI YOSHIYAMA
TERUO SATO
HITOSHI TAKEDA

BY Wenderoth, Lind & Ponack
ATTORNEYS

July 7, 1970 MASAMI YOSHIYAMA ET AL 3,519,880

ELECTROLUMINESCENT IMAGE DISPLAY SYSTEM HAVING IMPROVED HORIZONTAL SCANNING

Filed Nov. 29, 1967

4 Sheets-Sheet 2

INVENTORS
MASAMI YOSHIYAMA
TERUO SATO
HITOSHI TAKEDA

BY Wenderoth, Lind & Ponack

ATTORNEYS

INVENTORS
MASAMI YOSHIYAMA
TERUO SATO
HITOSHI TAKEDA

BY Wenderoth, Lind & Ponack
ATTORNEYS

INVENTORS
MASAMI YOSHIYAMA
TERUO SATO
HITOSHI TAKEDA

BY Wenderoth, Lind & Ponack
ATTORNEYS

United States Patent Office 3,519,880

Patented July 7, 1970

3,519,880

ELECTROLUMINESCENT IMAGE DISPLAY SYSTEM HAVING IMPROVED HORIZONTAL SCANNING

Masami Yoshiyama, Neyagawa-shi, Teruo Sato, Kadoma-shi, and Hitoshi Takeda, Kitakawachi-gun, Japan, assignors to Matsushita Electric Industrial Co. Ltd., Osaka, Japan Filed Nov. 29, 1967, Ser. No. 686,594
Claims priority, application Japan, Dec. 29, 1966, 42/1,185; Dec. 30, 1966, 42/116
Int. Cl. H05b *37/00, 39/00*
U.S. Cl. 315—169 9 Claims

ABSTRACT OF THE DISCLOSURE

An electroluminescent image display system adapted to reproduce a moving half-tone picture, such as a television image, including an electroluminescent, crossed-grid display panel, a horizontal electrode driving circuit, to provide a selecting pulse and blanking pulses during each horizontal period, a vertical electrode driving circuit comprising a delay line and brightness control gates, and video signal supply means.

Said brightness control gates are opened simultaneously by the gating action of said selecting pulse for each horizontal synchronizing signal of the video signal, and transmit the video signal, which is distributed on said delay line, to the associated vertical electrodes.

Consequently, the cells along the selected horizontal electrode are simultaneously luminous in response to the video signal, while at the same time luminosity is reduced in the remaining cells by the blanking pulses.

BACKGROUND OF THE INVENTION

Field of the invention

This invention relates to an image display system for flat panel-type displays, and more particularly to an electroluminescent image display system using a crossed-grid panel to reproduce a moving, half-tone picture such as a television image, from the image information signal.

Description of the prior art

A well-known electroluminescent crossed-grid display panel consists essentially of an electroluminescent layer and two sets of spaced parallel conductors. The first set of conductors is positioned on one side of the electroluminescent layer at right angles with respect to the second set of the conductors which is positioned on the other side of the electroluminescent layer. The conductors are referred to as the X (horizontal) and Y (vertical) electrodes.

When an alternating or pulsed voltage is applied across a pair of the horizontal and vertical electrodes, that portion of the electroluminescent layer located at the intersection of said electrodes, defined as a cell, is luminated, its brightness depending upon the amplitude, frequency and wave form of the applied voltage.

It is possible to produce an image on a crossed-grid display panel by arranging horizontal and vertical electrodes in a predetermined sequence, and by applying proper voltages, corresponding to the image information signals to said selected horizontal and vertical electrodes.

However, an undesired luminosity is generated by the cells along the selected electrodes, said luminosity being the result of the capacitive coupling between the cells. This phenomenon, called "cross effect," reduces the contrast between the image and the background. It is an important objective in designing a crossed-grid display system to eliminate or reduce the cross effect.

Various electroluminescent display systems and devices have been proposed. A phosphor screen, disclosed in U.S. Pat. No. 2,698,915 in the name of W. W. Piper, is the first and most basic electroluminescent crossed-grid display panel. The patent teaches that scanning should be done mechanically by the use of rotating switches. Such scanning, however, is too slow to reproduce a television image. Transfluxor controlled electroluminescent display panels, invented by J. A. Rajchman and described in U.S. Pat. No. 2,928,894, and display panels with a ferroelectric control, called an ELF screen, invented by E. A. Sack and described in U.S. Pat. No. 2,917,667, have a relatively complicated structure. Electroluminescent display panels with piezovoltaic controls, invented by S. Yando and described in U.S. Pat. No. 3,035,200, are based on the propagation of the elastic wave in the piezo materials, and therefore have a limited scanning speed.

Electroluminescent crossed-grid display panels have been known to have a great potential for practical use and for display purposes. It is important that the electroluminescent crossed-grid display system be capable of preventing cross effect and effectively switch the applied voltage between electrodes. It is a well known technique to provide in the construction of the display panel, an electroluminescent layer and a nonlinear impedance layer, comprising silicon carbide, cadmium sulfide, or cadmium selenide, embedded in a binder layer, sandwiched in series between the horizontal and vertical electrodes in order to practically eliminate or reduce the cross effect. Such panels may also be effective for accomplishing a satisfactory display.

In other devices, for example that disclosed in U.S. Pat. No. 2,892,968, the cross effect is prevented by the application of a blanking voltage, which has an opposite polarity to the control voltage, between the unselected horizontal and vertical electrodes. U.S. Pat. No. 2,947,912 also discloses a similar method.

The above methods are applicable to a crossed-grid display panel which uses sequential element-by-element scanning, but are difficult to apply to line-by-line scanning.

SUMMARY OF THE INVENTION

It is therefore an object of the present invention to provide an improved electroluminescent image display system having high speed scanning.

It is another object of this invention to provide an improved electroluminescent image display system which is capable of satisfactorily producing a moving half-tone picture, such as a television image.

It is still another object of the invention to provide an improved electroluminescent image display system in which the cross effect is reduced by applying blanking pulses to unscanned horizontal electrodes.

It is a further object of the invention to provide an improved electroluminescent image display system capable of controlling the brightness of the cells by means of a simplified circuitry.

It is a still further object of the invention to provide an improved electroluminescent display system capable of being driven by less electric power than prior art systems.

The present invention seeks to accomplish the above objectives with an electroluminescent display system comprising an electroluminescent crossed-grid display panel, a horizontal electrode driving circuit to provide a selecting pulse and blanking pulses during each horizontal period, a vertical electrode driving circuit comprising a delay line and brightness control gates, and video signal supply means.

Said brightness control gates are opened simultaneously by the gating action of said selecting pulse for each horizontal synchronizing signal of the video signal, and transmit the video signal, which is distributed on said delay line, to the associated vertical electrodes.

Consequently, the cells along the selected horizontal electrode are simultaneously luminous in response to the video signal, while at the same time luminosity is prevented in the remaining cells by the blanking pulses.

Other and further objects of the invention will be more clearly understood in the light of the following description taken together with the accompanying drawings wherein.

DESCRIPTION OF THE PREFERRED EMBODIMENT

Figure 1:
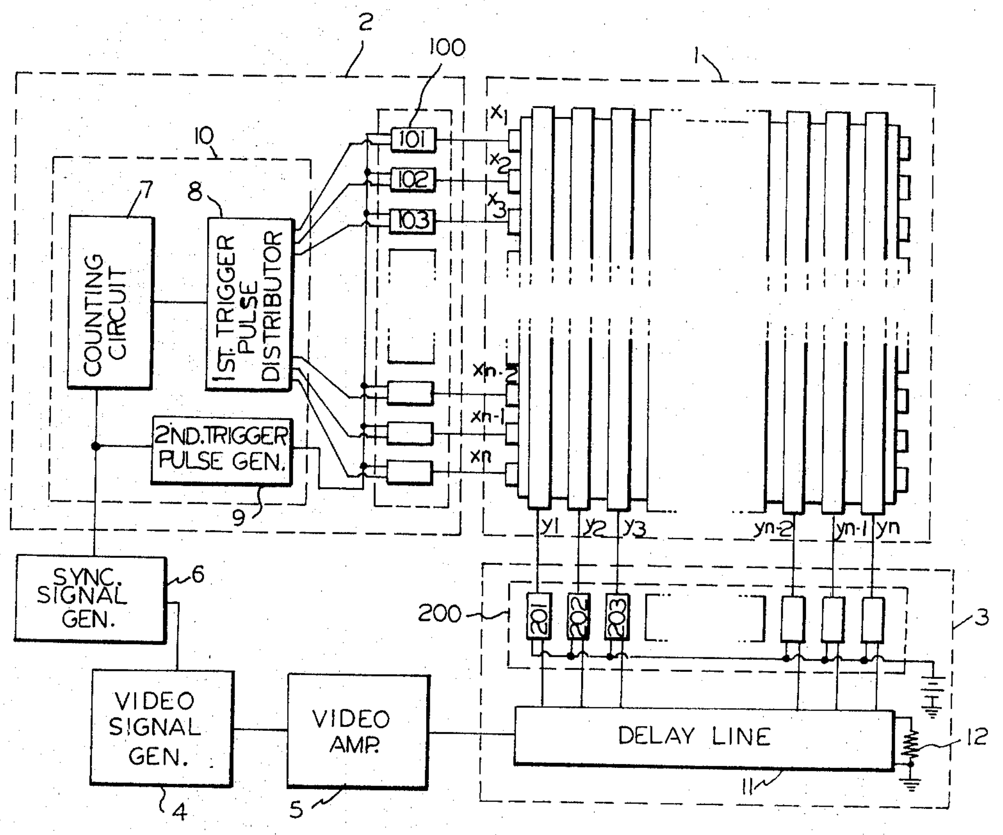
FIG. 1 is a block diagram of an electroluminescent, image display system according to the present invention.

Referring to FIG. 1, one embodiment of the present invention comprises an electroluminescent crossed-grid display panel 1, a horizontal electrode driving circuit 2, a vertical electrode driving circuit 3, a video signal generator 4, a video amplifier 5, and a synchronizing signal separator 6.

Figure 2:
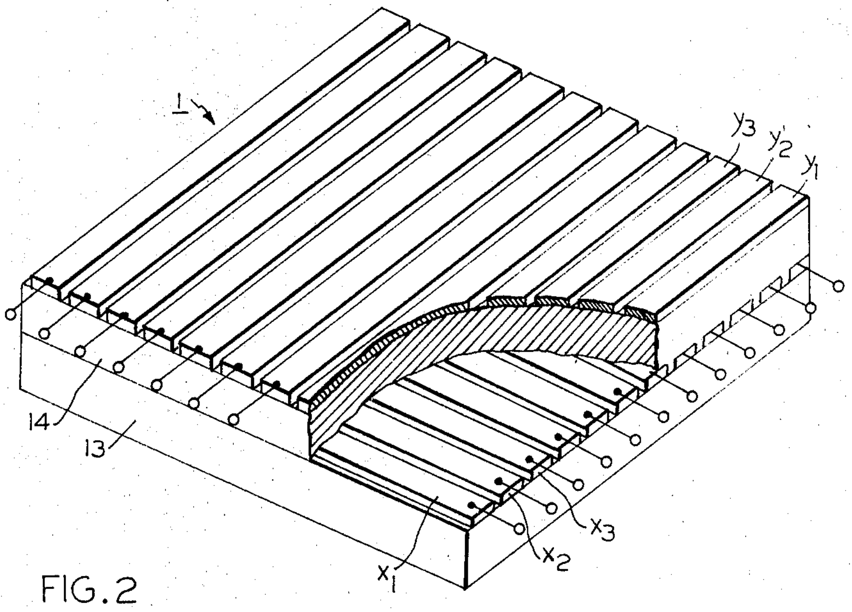
FIG. 2 is a perspective view, partly broken away, of a typical electroluminescent crossed-grid display panel.

The electroluminescent crossed-grid display panel 1, as shown in FIG. 2 for example, comprises a glass base plate 13, horizontal transparent electrodes $x_1$, $x_2$, $x_3$ . . . an electroluminescent layer 14, and vertical electrodes $y_1$, $y_2$, $y_3$ . . . . Accordingly, the electroluminescent crossed-grid display panel 1 has a multiplicity of picture elements or cells which are located at the intersections of the two sets of electrodes.

The display panel can be improved by employing a reflective layer and a nonlinear impedance layer which are additionally sandwiched between the horizontal and vertical electrodes in a manner similar to that of the prior art.

The horizontal electrode driving circuit 2 comprises a set 100 of pulse generators 101, 102, 103 . . . connected to the associated horizontal electrodes $x_1$, $x_2$, $x_3$ . . ., and a trigger pulse generating circuit 10 for generating trigger pulses for the triggering of the individual pulse generators 101, 102, 103 . . . . The trigger pulse generating circuit 10 comprises a counting circuit 7, a first trigger pulse distributor 8 and a second trigger pulse generator 9. The counting circuit 7 and the first trigger pulse distributor 8 are connected in series with each of the individual pulse generators and comprise well-known components such as a counting tube and a conventional magnetic core matrix; both can be replaced by a ring counter. The second trigger pulse generator 9 is connected in series with each individual pulse generator and is parallel with the counting circuit 7 and first trigger pulse generator 8 and comprises a conventional pulse generator such as a monostable multivibrator. A video signal generator 4 is connected through the synchronous signal separator 6 to the counting circuit 7 and the second trigger pulse generator 9 and generates video signals which are patterns or pictures; it can be replaced by a conventional television receiver or camera.

Horizontal and vertical synchronizing signals are separated from the video signal by the synchronizing signal separator 6. The horizontal synchronizing signal is applied to both the counting circuit 7 and the second trigger pulse generator 9. The vertical synchronizing signal is applied to the counting circuit 7. In association with the counting circuit 7, and the first trigger pulse distributor 8, a first trigger pulse is generated and is applied to the pulse generators 101, 102, 103 . . . in a predetermined sequence. A second trigger pulse is generated by the second trigger pulse generator 9 and is applied simultaneously to all of the pulse generators 101, 102, 103 . . . with the arrival of each horizontal synchronizing signal.

When the pulse generator 101 receives both the first and the second trigger pulses, a selecting pulse is generated in the pulse generator 101 and is applied to the selected horizontal electrode $x_1$. The other pulse generators 102, 103 . . . which receive only second trigger pulses generate blanking pulses and supply them to the remaining horizontal electrodes $x_2$, $x_3$ . . . .

The vertical electrode driving circuit 3 comprises a delay line 11 connected to a set 200 of brightness control gates 201, 202, 203 . . . .

The delay line 11 is a conventional electromagnetic delay line such as a constant-K type LC network and is tapped at equal intervals so as to be connected with the associated brightness control gates 201, 202, 203 . . . which in turn are connected with the associated vertical electrodes $y_1$, $y_2$, $y_3$ . . . . Said delay line 11 terminates in a resistor 12 whose value corresponds to the characteristic impedance of the delay line 11 in order to prevent reflections of the video signal from appearing at the end of the delay line 11. When the delay time of the delay line 11 is set to correspond to one horizontal scanning period of the video signal, for example, 63.5 microseconds for a standard television signal, it is possible to distribute a signal corresponding to one horizontal scanning line of the video signal over the length of the delay line 11.

The video signal, amplified to the proper voltage by a video amplifier 5, is applied to the input terminal of the delay line 11 and travels along the length of said delay line toward the terminal resistor 12. When a signal corresponding to one horizontal scanning line of the video signal has been distributed over the length of the delay line 11, the brightness control gates 201, 202, 203 . . . are opened simultaneously by the gating action of the selecting pulse which is applied to the selected horizontal electrode, and transmit the signal, sampled at each of the tapped points of the delay line 11, to the associated vertical electrodes $y_1$, $y_2$, $y_3$ . . . . Consequently, the cells along the selected horizontal electrode are luminous at the same time in response to the video signal. Such action is repeated for each horizontal period of the video signal, sequentially, and scanning of the whole display panel is thus carried out.

Figure 3:
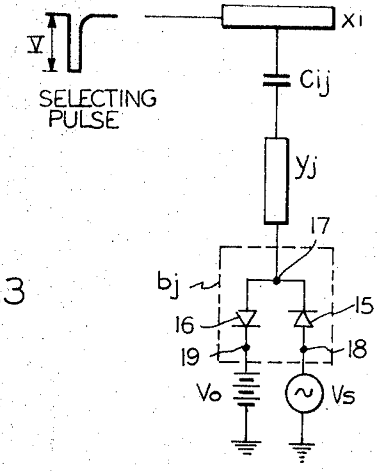
FIG. 3 is a circuit diagram for illustrating the operation of the brightness control gate.

Referring to FIG. 3, the operation of the brightness control gate will be described in more detail. The electrodes $x_i$ and $y_j$ are a horizontal and vertical electrode, respectively, and the cell formed at the intersection of these electrodes is denoted as a condenser $C_j$. A brightness control gate, denoted as $b_j$, consists essentially of two rectifiers 15 and 16 which are coupled in parallel in opposite directions and connected in series with the associated vertical electrode $y_j$, said conductors being at an intermediate terminal 17 of the coupled rectifiers 15 and 16.

If the selecting pulse is negative, the anode side 18 of the coupled rectifiers 15 and 16 is connected to a video voltage source $V_s$, and the cathode side 19 of the coupled rectifiers 15 and 16 is connected to a bias voltage source $V_o$, as shown in FIG. 3. The video voltage source $V_s$ represents the voltage of the video signal being distributed and sampled at each of the tapped points of the delay line 11, and the bias voltage source $V_o$ represents the bias voltage which is equal to or slightly larger than the maximum voltage of the video signal.

When the selecting pulse is positive, the coupled rectifiers 15 and 16 should be connected to each other in the reverse direction, and $V_o$ should be selected to be a value equal to or slightly smaller than the minimum voltage of the video signal.

The following description is for the case when the selecting pulse is negative.

The bias voltage $V_o$ which biases the coupled rectifiers 15 and 16 in the reverse direction keeps the brightness control gate $b_j$ closed, unless the selecting pulse is applied to one of the horizontal electrodes. When the selecting pulse V is applied to a selected horizontal electrode, the brightness control gate $b_j$ is opened and transmits the video signal $V_s$ to the associated vertical electrode $y_j$. The reason for this is that the selecting pulse appears at the intermediate terminal 17 due to the capacitive coupling of the condenser $C_{ij}$ and the voltage at the intermediate terminal 17 becomes lower than the video signal $V_s$ so that the rectifier 15 becomes conductive for the duration of the selecting pulse.

It is preferable that the rectifiers 15 and 16 have a capacitance as low as that of a point-contact germanium diode.

The rectifier 16 provides the voltage level $V_o$ at the intermediate terminal 17 when the selecting pulse is not present. Said rectifier 16 can be replaced by a resistor having a value of several hundred kilo-ohms. The resimplicity, $V_o=0$, that is, the cathode side 19 of the brightness control gate than does the rectifier. Consequently, the cell denoted as the condenser $C_{ij}$ will be luminous in response to the voltage $[V-(V_s-V_o)]$. For simplicity, $V_o=0$, that is, the cathode side 19 of the coupled rectifiers 15 and 16 is grounded. When $V_s$ is zero, the cell will be luminous at a maximum brightness. As $V_s$ increases negatively, the brightness of the cell will decrease.

It may be understood that the selecting pulse V is independent of $V_s$ and acts as an exciting pulse for the cell $C_{ij}$ as well as a gating pulse for the brightness control gate $b_j$.

It is necesary that the amplitude of the selecting pulse be more than 200 V for the conventional electroluminescent crossed-grid display panel in order to obtain the proper brightness.

Also, it is preferable that the duration of the selecting pulse be shorter than the 10 microseconds which corresponds to the horizontal blanking period in a standard television signal.

It has been discovered, according to the present invention, that the cross effect in an electroluminescent image display system is reduced by applying blanking pulses, which are in phase with the selecting pulse, to the remaining horizontal electrodes during line-by-line scanning.

Figure 4:
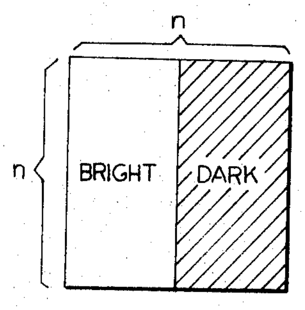
FIG. 4 is a view of a special pattern of the display panel where the left half is bright and the right half is dark.

Consider now the special case where a pattern, such as the one shown in FIG. 4, in which the left half of the display panel is bright and the right half is dark, is produced on an electroluminescent crossed-grid display panel having picture elements consisting of $(m)\times(n)$ cells, where $m$ represents the number of horizontal electrodes, and $n$ represents the number of vertical electrodes. For simplicity, assume that $m$ is equal to $n$. For convenience, $m$ will be denoted as $n$ throughout the remainder of this disclosure.

As described above the bright portion of the pattern in FIG. 4 corresponds to the condition in which the video signal is zero, that is, the vertical electrodes in the left half of the panel are grounded. On the other hand, the dark portion of the pattern corresponds to the condition in which the video signal is large in the negative direction, that is, when the vertical electrodes in the right half of the panel are insulated from ground. The equivalent circuit for this case is as shown in FIG. 5, where the horizontal and vertical electrodes are denoted as $x_1 \ldots x_n$ and $y_1 \ldots y_n$, respectively, and the cells at the intersections are denoted as condensers C.

Figure 5:
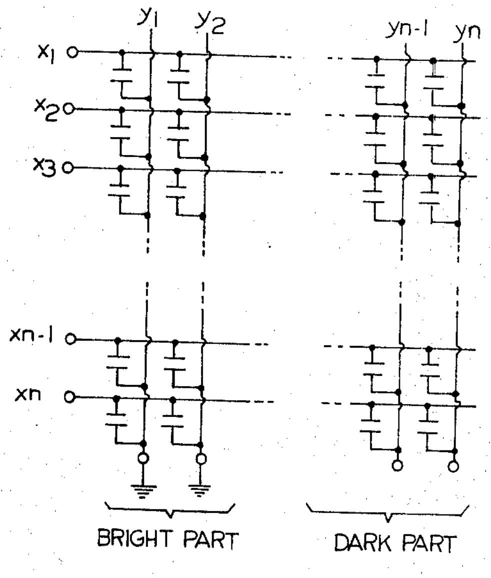
FIG. 5 is a circuit diagram of the equivalent circuit for displaying the pattern shown in FIG. 4.
Figure 6:
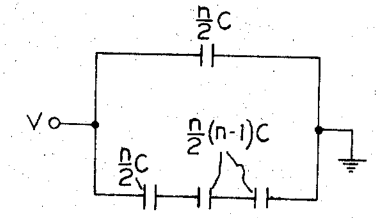
FIG. 6 is a simplified version of the equivalent circuit of FIG. 5.

FIG. 6 is another equivalent circuit which simplifies the equivalent circuit shown in FIG. 5 for the case when the selecting pulse V is applied to one of the horizontal electrodes. It is easily understood from FIG. 6 that the voltage V is applied to the cells of the bright portion of the display panel, and that the voltage $(n-1/n+1)V$ appears across the cells of the dark portion. As $n$ increases, the voltage across the cells of the dark portion of the display panel will approach the value of V and therefore the difference between the bright portion and the dark portion of the display panel will almost disappear.

Figure 7:
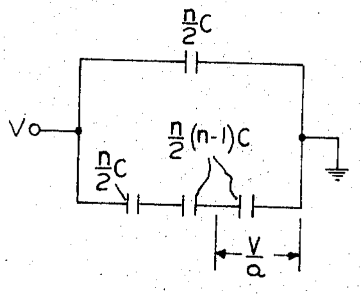
FIG. 7 is a circuit diagram of the equivalent circuit corresponding to FIG. 6 for applying blanking pulses according to the present invention.

FIG. 7 is an equivalent circuit corresponding to FIG. 6. It represents the case where the selecting pulse V is applied to a selected horizontal electrode, and the blanking pulses, which have a value of $V/a$ $(a>1)$ and which are in phase with the selecting pulse, are applied to the other, unselected, horizontal electrodes, in accordance with the present invention.

As shown in FIG. 7, a voltage $V_D$, which appears across the cells of the dark portion, is $$V_D=\frac{n-1}{n}\left(1-\frac{1}{a}\right)V$$

When $n$ is sufficiently large, the above mentioned voltage $V_D$ will be approximately equal to a value of $$V_D=\left(1-\frac{1}{a}\right)V$$

In general, the brightness of an electroluminescent cell has a remarkable nonlinear relationship to the applied voltage. Over a limited range it can be expressed by the simple formula, $$L=kv^t$$

where L is the brightness of the electroluminescent cell, $k$ is a constant and V is the applied voltage.

For an electroluminescent cell having a phosphor layer, such as activated zinc sulfide, embedded in an insulating binder, $t$ is nearly four. This value of $t$ is not sufficiently nonlinear. The brightness-voltage nonlinearity is enlarged by sandwiching an additional nonlinear impedance layer between the electrodes.

In the case where the pattern shown in FIG. 4 is produced over the entire display panel by the scanning process of the present system, the contrast ratio of the bright and the dark portions is calculated as follows:

$$\text{Contrast ratio}=\frac{1+\left(\frac{1}{a}\right)^t(n-1)}{\left(1-\frac{1}{a}\right)^t}$$

It is understood that the contrast ratio increases with an increase in "$t$" and/or with an approach of "$a$" toward 1.

Figure 8:
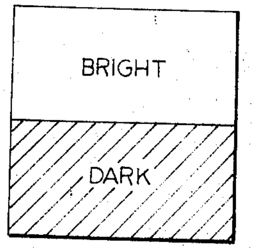
FIG. 8 is a view of another special pattern of the display panel where the upper half is bright and the lower half is dark.

FIG. 8 illustrates another special pattern where the upper half of the display panel is bright and the lower half is dark. For the case when the pattern shown in FIG. 8 is produced on the display panel in accordance with the present system, the contrast ratio may also be calculated in the manner described above as follows:

$$\text{Contrast ratio} = \frac{1+\left(\frac{1}{a}\right)^t\left(\frac{n}{2}-1\right)}{\left(\frac{1}{a}\right)^t+\left(1-\frac{1}{a}\right)^t}$$

This contrast ratio is of a complex form, but it increases absolutely with an increase in the value of "$t$" and it has its maximum value when "$a$" has a value of about 3.

This means that in this case it is proper to use a blanking pulse having an amplitude of one-third of the selecting pulse. The contract ratio differs with each pattern produced by the system. It has been discovered according to the present invention that an amplitude of from between one-half and one-third of the amplitude of the selecting pulse is most suitable for the amplitude of the blanking pulses.

Figure 9:
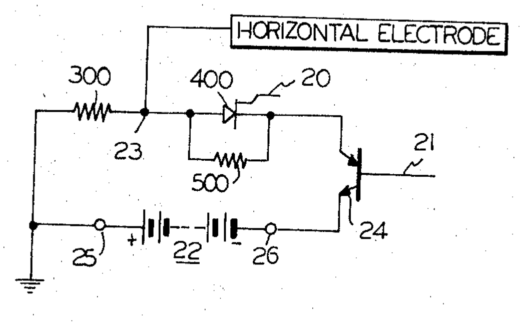
FIG. 9 is a circuit diagram of a basic circuit of a pulse generator.

FIG. 9 illustrates the basic circuit of a pulse generator for providing the selecting pulse or the blanking pulses to the horizontal electrodes.

Said pulse generator comprises a DC source 22 and, in series, a first resistor 300, a parallel connected silicon controlled rectifier 400 (hereinafter abridged to SCR) and a second resistor 500, and a gate-turn-off type silicon controlled rectifier 24 (hereinafter bridge to GTO). The DC source 22, having a voltage V, is connected to the series connected elements in such a way that the positive terminal 25, which is grounded, is connected to one end of the first resistor 300 and the negative terminal 26 is connected to the cathode of the GTO 24. The horizontal electrode is connected to the junction point 23, located between resistor 300 and the parallel connected resistance 500 and SCR 400.

Generally, it is possible for the GTO to switch a current flowing through the main circuit on and off by controlling the gate electrode, but it is not easy for the SCR to switch the current off by such means. The present embodiment employs both the SCR and the GTO for this operation.

The operation of the pulse generator shown in FIG. 9 will now be described. The potential of the horizontal electrode connected to the junction point 23 is equivalent to ground potential when the SCR 400 and the GTO 24 are in a nonconductive state. When the first trigger pulse is applied to the gate electrode 20 of the SCR 400 and the second trigger pulse is applied to the gate electrode 21 of the GTO 24, concurrently, both the SCR 400 and GTO 24 become conductive and hence the potential of the horizontal electrode becomes —V as a result of the voltage drop caused by the current flowing through the resistor 300. When the second trigger pulse which triggers the GTO 24 disappears, the GTO 24 becomes nonconductive, and consequently, the SCR 400 also becomes nonconductive because the current flowing through the SCR 400 falls below the holding current. Hence, the potential of the horizontal electrode is returned to ground potential. As a result of the above described operation, the horizontal electrode is briefly supplied with a negative selecting pulse having an amplitude of V.

When only the second trigger pulse is applied to the gate electrode 21 of the GTO 24, the GTO 24 becomes conductive during the duration of said second trigger pulse. Assuming that the resistance values of the resistors 300 and 500 are R and R′, respectively, the potential of the horizontal electrode reaches the value of $-RV/(R+R')$ due to the current flowing through the resistors 300 and 500. As a result, the horizontal electrode is supplied with a negative blanking pulse having an amplitude of $RV/(R+R')$, which is in phase with the selecting pulse. The ratio of the selecting pulse amplitude to the blanking pulse amplitude can be controlled by changing the values of R and R′.

Figure 10:
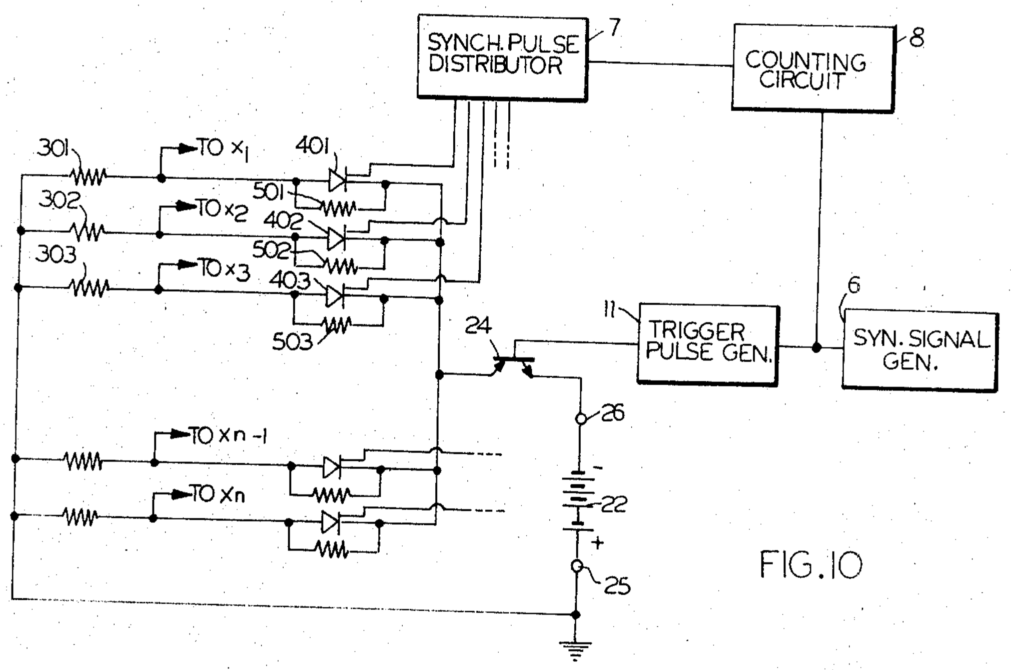
FIG. 10 is a circuit diagram of an embodiment of a horizontal electrode driving circuit using the pulse generators shown in FIG. 9.

FIG. 10 illustrates an embodiment of a horizontal electrode driving circuit using a set of the pulse generators as shown in FIG. 9. It is not necessary that each of the pulse generators comprise a GTO 24 and a DC source 22. In practice, a common GTO 24 and DC source 22 is connected to a plurality of pulse generators, as shown in FIG. 10.

As described above, the first trigger pulse is applied to a given SCR selected from the plurality of SCR's 401, 402, 403 . . . in a predetermined sequence in association with the counting circuit 7 and the first trigger pulse distributor 8, while the second trigger pulse is applied to the GTO 24 in connection with the operation of the second trigger pulse generator 9 in response to the horizontal synchronizing signals.

When the first trigger pulse is applied to the gate electrode of the SCR 401 and the second trigger pulse is applied to the gate electrode of the GTO 24, at the same time, the selected horizontal electrode $x_1$ is supplied with a negative selecting pulse having an amplitude of V, and the other, unselected, horizontal electrodes $x_2$, $x_3$ . . . are supplied with negative blanking pulses having an amplitude of $RV/(R+R')$ in phase with the selecting pulse.

The horizontal electrode scanning will be completed, by repeating the above operation, upon the arrival of each of the horizontal synchronizing signals in a predetermined sequence. The pulse distributor will then be returned to its starting position by a vertical synchronizing.

As described above, the positive terminal 25 of the DC voltage source 22 is ordinarily grounded; however, it is not essential that it be at said ground potential. It is advantageous, in view of the possibility of breakdown of the electroluminescent cell, to ground the positive terminal 25 of the DC voltage source 22 since the vertical electrodes are ordinarily grounded when a selecting pulse is not being applied to a horizontal electrode.

Figure 11:
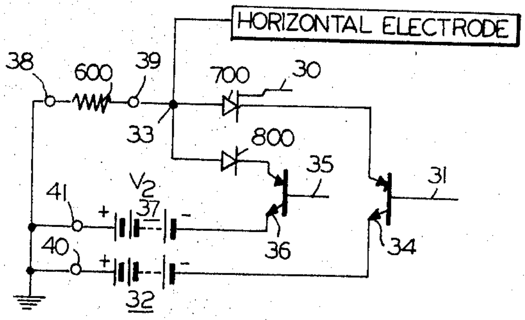
FIG. 11 is the circuit diagram of a basic circuit of another pulse generator.

FIG. 11 illustrates the basic circuit of another pulse generator for providing the selecting pulse and the blanking pulses to the horizontal electrodes.

This pulse generator consists of a first closed circuit for generating the selecting pulse and a second closed circuit for generating the blanking pulse. The first closed circuit comprises a first DC source 32 and, in series, a resistor 600, a SCR 700 and a first GTO 34. The second closed circuit comprises a second DC source 37 and, in series, a resistor 600, a diode 800 and a second GTO 36. The first and the second closed circuits contain the common resistor 600. One end 38 of the common resistor 600 is connected to the positive terminals 40 and 41 of both the first and the second DC sources 32 and 37, and the other end 39 of the common resistor 600 is connected to both the SCR 700 and the diode 800. It is also connected to a horizontal electrode.

It is advantageous for this pulse generator to be able to adjust the amplitudes of the selecting pulse and the blanking pulses independently by simply controlling the output voltages $V_1$ and $V_2$ of the first and the second DC sources 32 and 37, respectively. The positive terminals 40 and 41 of the first and the second DC sources 32 and 37 are ordinarily grounded as shown in FIG. 11. In this case, $V_1$ is larger than $V_2$.

The operation of the pulse generator shown in FIG. 11 is as follows: The potential of the junction point 33 is normally ground potential, because the SCR 700 and the GTO's 34 and 36 are in a nonconductive state in the absence of a trigger pulse. When the first trigger pulse is applied to the gate electrode 30 of the SCR 700 and the second trigger pulse is simultaneously applied to the gate electrodes 31 and 35 of the GTO's 34 and 36, the potential of the junction point 33 reaches $-V_1$ due to a current flowing through the first closed circuit. At the same time, current is prevented from flowing through the second closed circuit by the diode 800 which is back-biased. The potential of the junction point 33 is returned to ground potential by the disappearance of the first and the second trigger pulses. As a result, the horizontal electrode, connected to the junction point 33, is supplied with a selecting pulse having an amplitude of $V_1$. When the second trigger pulse alone is simultaneously applied to the gate electrode 31 of the first GTO 34 and to the gate electrode 35 of the second GTO 36, the potential of the junction point 33 reaches $-V_2$ due to the current flowing through the second closed circuit. On the other hand, under these conditions no current is flowing through the first closed circuit because the SCR 700 is in a nonconductive state. Therefore, the horizontal electrode connected to the junction point 33 is supplied with a blanking pulse which has an amplitude of $V_2$ and which is in phase with the selecting pulse.

Figure 12:
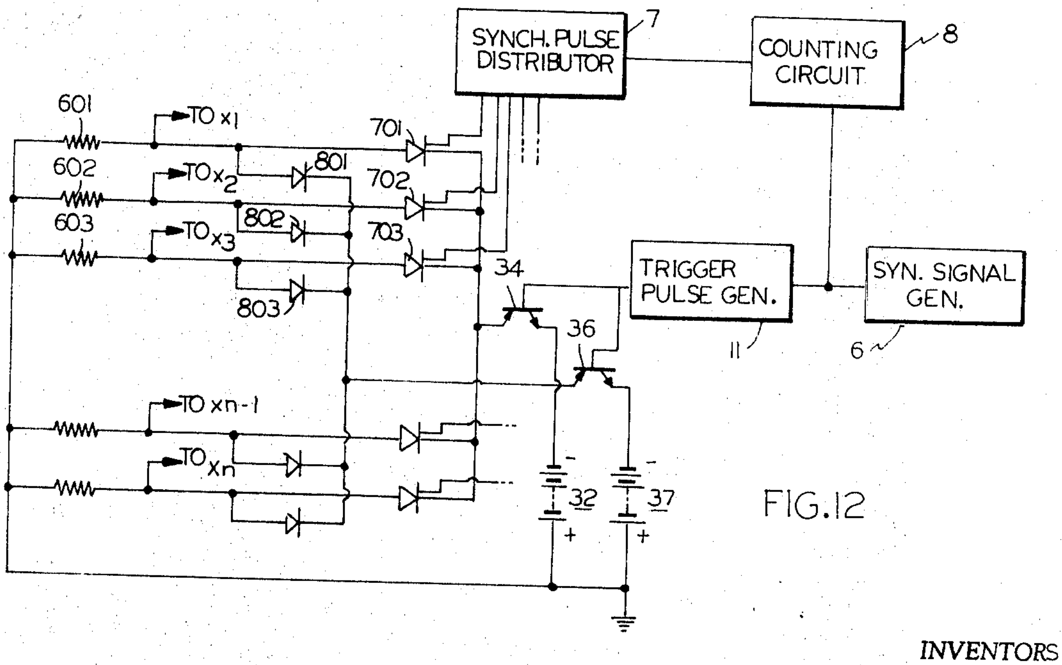
FIG. 12 is the circuit diagram for another embodiment of a horizontal electrode driving circuit using the pulse generators shown in FIG. 11.

FIG. 12 illustrates an embodiment of a horizontal electrode driving circuit using a set of the pulse generators shown in FIG. 11. It is not necessary that each of the pulse generators has separate GTO's 34 and 36 and DC sources 32 and 37. In a practical circuit, as shown in FIG. 12, one set of GTO's and one set of DC sources can be used which are common to the plurality of pulse generators in the circuit. Positive terminals 40 and 41 of the DC sources 32 and 37 are ordinarily grounded as shown in FIG. 12. The foregoing discussion of the potential at the positive terminal 25 in FIG. 10 is applicable to FIG. 12. As described before, the first trigger pulse is applied to one SCR selected from the SCR's 701, 702, 703 . . . in a predetermined sequence in association with the counting circuit 7 and the first trigger pulse distributor 8, while the second trigger pulse is applied to the first and the second GTO's 34 and 36 by the operation of the second trigger pulse generator 9 upon the arrival of each horizontal synchronizing signal.

It is easily understood from the above description that the selected horizontal electrode is supplied with a selecting pulse having an amplitude of $V_1$ and that the horizontal electrodes not selected are supplied with the blanking pulses having an amplitude of $V_2$, said blanking pulse being in phase with the selecting pulse.

In order that the above description be easily understandable, it has been made assuming that all of the trigger pulses occurred concurrently. In practice it is preferable that the trigger pulse for triggering the SCR be applied a few microseconds earlier than the trigger pulse for triggering the GTO in order to compensate for a time lag due to the switching characteristics of the SCR.

While the present invention has been described with reference to reproducing the video signal of a television image, it will be understood that many modifications may be made for achieving other objects without actually departing from the present invention.

What is claimed is:

1. An electroluminescent image display system including an electroluminescent crossed-grid display panel having transversely spaced horizontal and vertical electrodes and having a multiplicity of picture elements located between said horizontal and vertical electrodes where they cross each other; a horizontal electrode driving circuit coupled to said horizontal electrodes for providing a selecting pulse for selected horizontal electrode and blanking pulses, which are in phase with said selecting pulse, for the remaining horizontal electrodes in a predetermined sequence; a vertical electrode driving circuit coupled to said vertical electrodes and comprising a set of brightness control gates and a delay line having a delay time corresponding to one horizontal scanning period of the video signal and having tapped points at equal intervals therealong; and video signal supply means coupled to said vertical electrode driving circuit for supply an amplified video signal to the input terminal of said delay line; each of said tapped points of said delay line being connected to a respective associated vertical electrode through an associated brightness control gate, and each of said brightness control gates being opened simultaneously by the gating action of said selecting pulse and transmitting said video signal sampled at each of the tapped points of said delay line to each of said associated vertical electrodes so that said picture elements along said selected horizontal electrode become luminous at the same time in response to said video signal.

2. An electroluminescent image display system as claimed in claim 1, wherein said horizontal electrode driving circuit includes means for generating a blanking pulse having an amplitude between one-half and one-third of said selecting pulse.

3. An electroluminescent image display system as claimed in claim 1, wherein each of said brightness control gates consists essentially of two coupled rectifiers.

4. An electroluminescent image display system as claimed in claim 1, wherein said horizontal electrode driving circuit comprises a set of pulse generators connected to respective associated horizontal electrodes, and a trigger pulse generating circuit for triggering said set of pulse generators, said pulse generator providing a selecting pulse for a selected horizontal electrode and providing blanking pulses for the remaining horizontal electrodes, said blanking pulses being in phase with said selecting pulse.

5. An electroluminescent image display system as claimed in claim 4, wherein said pulse generator generates blanking pulses having an amplitude of between one-half and one-third of said selecting pulse.

6. An electroluminescent image display system as claimed in claim 4, wherein each of said pulse generators comprises a DC power supply means and in series, a first resistor, a parallel connected SCR and a second resistor, and a GTO in the recited order, said DC power supply means being connected to said series with the positive terminal connected to said first resistor and the negative terminal connected to said GTO, the junction point of said first resistor and said parallel connection being connected to the associated horizontal electrode.

7. An electroluminescent image display system as claimed in claim 4 wherein each of the pulse generators comprises, in series, a first resistor and a parallel connected SCR and a second resistor, a DC power supply means connected in common to each of said first resistors, and a GTO to which the second resistors are connected in common, the DC power supply means being connected with the positive terminal connected to the first resistors and the negative terminal connected to said GTO, the junction point of each of said first resistors and the parallel connection being connected to the associated horizontal electrode.

8. An electroluminescent image display system as claimed in claim 4, wherein each of said pulse generators consists of a first closed circuit for generating a selecting pulse and a second closed circuit for generating a blanking pulse, said first closed circuit each comprising a first DC power supply means and, in series, a resistor, a SCR and a first GTO, said second closed circuits each comprising a second DC power supply means, and in series, said resistor from the corresponding first closed circuit, a diode and a second GTO, said first and second closed circuits having said resistor in common, one end of said common resistor being connected to the positive terminal of both said first and second DC power supply means, the other end of said common resistor being connected to both said SCR and said diode and also connected to the associated horizontal electrode.

9. An electroluminescent image display system as claimed in claim 4 wherein each of said pulse generators consists of a first closed circuit for generating a selecting pulse and a second closed circuit for generating a blanking pulse, said first closed circuits each comprising, in series, a resistor, and a SCR, a first DC power supply means common to all of said circuits and connected to said resistor in each circuit and a first GTO common to all of said circuits and connected to said resistor in each circuit and a first GTO common to all of said circuits and to which the SCR's are connected, said second closed circuits each comprising, in series, said resistor from the corresponding first closed circuit, and a diode, a second DC power supply means common to all of said second circuits and connected to said resistor in each second circuit, and a second GTO common to all of said circuits and to which the diodes are connected, the positive terminal of the DC supply being connected to the resistors and the negative terminal being connected to the GTO in each group of circuits, the junction between the resistor and the SCR and the diode in each circuit being connected to the associated horizontal electrode.

References Cited

UNITED STATES PATENTS

| | | | |
|---|---|---|---|
| 2,892,968 | 6/1959 | Kallmann et al. | 315—169 |
| 2,917,667 | 12/1959 | Sack | 315—169 |
| 2,995,682 | 8/1961 | Livingston | 315—169 |
| 3,048,824 | 8/1962 | Thompson | 315—169 X |
| 3,096,516 | 7/1963 | Pendleton et al. | 315—169 X |
| 3,263,120 | 7/1966 | Aiken | 315—169 |
| 3,328,790 | 6/1967 | Rhodes | 315—169 X |
| 3,343,128 | 9/1967 | Rogers | 315—169 X |
| 3,379,831 | 4/1968 | Hashimoto | 315—169 X |

OTHER REFERENCES

"Solid State Electroluminescent Display and Scanning Apparatus," by Lynch, IBM Technical Disclosure Bulletin, vol. 9 No. 12, May 1967.

JOHN W. HUCKERT, Primary Examiner

A. J. JAMES, Assistant Examiner

U.S. Cl. X.R.

178—7.3; 315—167; 340—166